Patented July 10, 1945

2,380,248

UNITED STATES PATENT OFFICE 2,380,248

PURIFICATION OF TRINITROTOLUENE

Marshall F. Acken and Robert M. Cavanaugh, Woodbury, N. J., assignors to E. I. du Pont de Nemours & Company, Wilmington, Del., a corporation of Delaware No Drawing. Application May 6, 1941,
Serial No. 392,094

2 Claims. (Cl. 260—645)

This invention pertains to an improved process for purifying trinitrotoluene.

Trinitrotoluene is usually prepared by the nitration of toluene with suitable nitration acid mixtures. The crude trinitrotoluene as it leaves the nitrator is composed chiefly of the symmetric or alpha form of trinitrotoluene, together with some impurities. These impurities include isomeric trinitrotoluenes, such as beta and gamma isomers, as well as various oxidation products. The removal of the undesirable isomers constitutes the prime function of the purification treatment essential for the production of trinitrotoluene of high quality. Among the known processes for effecting removal of these impurities, perhaps the most suitable involves the treatment of the crude trinitrotoluene with a solution of alkali metal sulfites, such as sodium sulfite. Heretofore, the employment of alkali metal sulfite solutions for the purification has invariably been characterized by the use of a quantity of sulfite which is more than sufficient for complete reaction of all the undesirable isomers. This was done because it was believed that the use of an excessive quantity would insure the highest possible removal of the impurities. Such procedure, although yielding a trinitrotoluene having a purity which met the usual specifications, entails the loss of an appreciable quantity of alpha trinitrotoluene.

The object of the present invention is an improved process for purifying trinitrotoluene. Another object is a process for purifying trinitrotoluene which is characterized by the production of a material of enhanced purity while simultaneously decreasing the loss of alpha trinitrotoluene. A further object is a process for purifying trinitrotoluene by means of an alkali metal sulfite solution, said process being characterized by the fact that the loss of alpha trinitrotoluene is decreased over that which characterizes the processes known heretofore. Further objects will become apparent as the invention is described in detail hereinafter.

We have found that the foregoing objects are attained by subjecting crude trinitrotoluene to a preliminary treatment with an alkali metal sulfite solution containing a quantity of the alkali sulfite insufficient to react with all the isomeric trinitrotoluenes which are to be removed. We have found that, if a quantity of the alkali metal sulfite which is insufficient to effect complete reaction of all the isomeric impurities is added to the crude trinitrotoluene in the form of a preliminary treatment, it then becomes possible to obtain a higher yield of the pure alpha trinitrotoluene than would be possible when operating in accordance with known procedures. Thus, if sodium sulfite is employed, we add a quantity of this material which is appreciably less than that considered necessary for complete reaction of all beta and gamma isomers present in the crude trinitrotoluene. Following this preliminary treatment, the trinitrotoluene is separated from the spent sulfite solution, washed, and again subjected to treatment with an additional quantity of a solution of sodium sulfite.

We are not certain of the explanation for this diminution in the loss of alpha trinitrotoluene. It is believed, however, that the reaction between the impurities and the alkali metal sulfite proceeds rather rapidly, in contrast to the reaction between alpha trinitrotoluene and the alkali sulfite. For this reason, when an insufficient quantity of alkali metal sulfite, such as sodium sulfite is employed, all the sodium sulfite reacts with the beta and gamma isomers before any significant quantity of the sodium sulfite has had an opportunity to react with the alpha trinitrotoluene. Consequently, little, if any, of the desired alpha trinitrotoluene is lost due to reaction. However, if the sodium sulfite be used in quantities exceeding those necessary for effecting reaction of all the beta and gamma isomers present, the material in excess has the opportunity of reacting with the alpha trinitrotoluene, thereby causing a loss in yield of the desired product. In view of the fact that we have not been able to establish this explanation conclusively, we do not intend to be bound thereby, but instead set it forth merely as a theory.

Although our process may be applied to the purification of crude trinitrotoluene in either the crystalline or molten state, we find it particularly advantageous when adapted to trinitrotoluene first when it is in the molten state, followed by treatment when in crystalline condition. Thus, crude molten trinitrotoluene is first treated with a sodium sulfite solution wherein the quantity of sodium sulfite is insufficient to cause reaction of all the beta and gamma isomers of trinitrotoluene which are present. The trinitrotoluene so treated is then washed while still in the molten condition, following which it is crystallized and treated again with sodium sulfite solution. In this latter treatment, the quantity of sodium sulfite employed is influenced by the quantity which has been used for the preliminary treatment. Preferably, it constitutes the difference between the quantity necessary for complete reaction of all the isomeric impurities and the quantity which was used in the preliminary treatment. Thus, if 200 lbs. of sodium sulfite is deemed necessary for complete reaction of the isomeric impurities, and 125 lbs. is employed for treatment of the molten trinitrotoluene, 75 lbs. will be sufficient for treatment of the crystalline material.

The modus operandi of the present invention is illustrated in the following example:

Example

A mixture of 3400 lbs. of crude crystalline trinitrotoluene and 53 gals. of water was treated with 153 lbs. of an aqueous sodium sulfite solution. At the time of the addition of the sulfite solution, the trinitrotoluene-water mixture was at 60° C. The resultant mixture was agitated for 15 minutes, following which the spent sulfite solution was removed. Then an additional 153 lbs. of sodium sulfite solution was introduced and the treatment was repeated. The purified trinitrotoluene had a freezing point of 80.58° C. When similar crude trinitrotoluene was accorded a single treatment with 306 lbs. of sodium sulfite under conditions identical to those set forth above, the purified material had a freezing point of 80.35° C.

It will be understood that the present invention is not limited to any specific number of treatments with the alkali metal sulfite solution. The sole prerequisite is that the first or preliminary treatment be effected with an insufficient quantity of the alkali metal sulfite to react with all the isomeric impurities present in the crude trinitrotoluene. This preliminary treatment may be followed by a plurality of treatments with the alkali metal sulfite solution. Although, as stated hereinbefore, we prefer to employ, as a total quantity of alkali metal sulfite, the amount necessary for complete reaction with all the isomeric impurities, the sum total of the alkali metal sulfite employed may exceed the quantity deemed necessary for complete reaction. This is particularly true if the excess of alkali metal sulfite is employed in the later purification treatments, because of the fact that in these treatments the isomeric impurities have been decreased appreciably, so that the removal of the relatively small proportions of these requires a correspondingly small quantity of the alkali metal sulfite. In such cases, slight excesses of alkali metal sulfite may cause some loss of alpha trinitrotoluene, but the loss, if any, is negligible.

It will also be understood that the pH value of the alkali metal sulfite solution may be controlled in accordance with the disclosure by Castner et al. in U. S. Patent No. 2,132,845, and also by Davies in U. S. Patent No. 1,975,598. The controlling of the pH value of the alkali metal sulfite solution when it is employed in conjunction with either molten crude trinitrotoluene or crystals of crude trinitrotoluene has proved advantageous and such control is contemplated in conjunction with the present process.

It will be seen from the foregoing discussion that the purification of crude trinitrotoluene by means of the present process permits the production of a trinitrotoluene of high purity, while simultaneously decreasing the loss of alpha trinitrotoluene to a practicable minimum.

Various modifications may be made from the foregoing description without departing from the spirit or scope thereof. Thus, although we have mentioned only sodium sulfite as an example of an alkali metal sulfite, various other sulfites are also suitable, among which may be mentioned potassium sulfite and ammonium sulfite. We intend therefore to be limited only in accordance with the following claims.

We claim:

1. A method for purifying trinitrotoluene by means of an alkali metal sulfite solution, which comprises subjecting crude trinitrotoluene to a preliminary treatment with the alkali metal sulfite solution in such proportion that the quantity of alkali metal sulfite is insufficient to react with all the isomeric impurities present in said crude trinitrotoluene, separating the resultant trinitrotoluene from the spent alkali metal sulfite solution, and then retreating said resultant trinitrotoluene with an additional quantity of fresh alkali metal sulfite solution, the total quantity of the alkali metal sulfite solution employed representing approximately the amount theoretically necessary for reaction of all the isomeric impurities originally present in the crude trinitrotoluene.

2. A method for purifying trinitrotoluene by means of an alkali metal sulfite solution, which comprises subjecting the crude molten trinitrotoluene to a preliminary treatment with the alkali metal sulfite solution in such proportions that the quantity of alkali metal sulfite solution is insufficient to react with all the isomeric impurities present in said crude molten trinitrotoluene while simultaneously controlling the pH value of the alkali metal sulfite solution, separating the resultant trinitrotoluene from the spent alkali metal sulfite solution, crystallizing the trinitrotoluene, and then treating said trinitrotoluene crystals with an additional quantity of fresh alkali metal sulfite solution while controlling the pH value of said alkali metal sulfite solution, the total quantity of the alkali metal sulfite solution employed representing approximately that which is necessary for complete reaction of all the isomeric impurities originally present in the crude trinitrotoluene.

MARSHALL F. ACKEN.
ROBERT M. CAVANAUGH.